(12) United States Patent
Fimml et al.

(10) Patent No.: US 12,025,050 B2
(45) Date of Patent: Jul. 2, 2024

(54) PRE-CHAMBER AND METHOD FOR PRODUCING A PRE-CHAMBER

(71) Applicant: INNIO Jenbacher GmbH & Co OG, Jenbach (AT)

(72) Inventors: Wolfgang Fimml, Maurach in Tirol (AT); Nikolaus Spyra, Innsbruck (AT); Jakub Pinkowicz, Warsaw (PL)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/275,389

(22) PCT Filed: Feb. 2, 2021

(86) PCT No.: PCT/AT2021/060038
§ 371 (c)(1),
(2) Date: Aug. 1, 2023

(87) PCT Pub. No.: WO2022/165540
PCT Pub. Date: Aug. 11, 2022

(65) Prior Publication Data
US 2024/0110503 A1 Apr. 4, 2024

(51) Int. Cl.
*F02B 19/16* (2006.01)
*F02B 19/10* (2006.01)
*F02B 19/00* (2006.01)

(52) U.S. Cl.
CPC .......... *F02B 19/16* (2013.01); *F02B 19/1014* (2013.01); *F02B 2019/008* (2013.01)

(58) Field of Classification Search
CPC . F02B 19/16; F02B 19/1014; F02B 2019/008
(Continued)

(56) References Cited

U.S. PATENT DOCUMENTS 2,999,484 A 9/1961 Lusznat
2011/0308489 A1 12/2011 Herden
(Continued)

FOREIGN PATENT DOCUMENTS

DE 102018206784 A1 * 11/2019
GB 2545479 A * 6/2017 .............. F02B 19/12
(Continued)

OTHER PUBLICATIONS

DE-102018206784-A1 (Quest et al.) (Nov. 7, 2019) (Machine Translation) (Year: 2019).*
(Continued)

*Primary Examiner* — Mahmoud Gimie
(74) *Attorney, Agent, or Firm* — Fletcher Yoder, P.C.

(57) ABSTRACT

Pre-chamber for an internal combustion engine, preferably gas engine, comprising:
  a pre-chamber body;
  a pre-chamber volume which is surrounded by the pre-chamber body; and
  a pre-chamber tip portion comprising at least two, preferably more than two, spray nozzles, wherein the at least two spray nozzles are in fluid communication with the pre-chamber volume, and the pre-chamber tip portion is affixed to the pre-chamber body by a welding process or a brazing process;
wherein the pre-chamber body consists of a material with higher thermal conductivity than the pre-chamber tip portion.

25 Claims, 5 Drawing Sheets

(58) Field of Classification Search
USPC .......................................................... 123/285
See application file for complete search history.

(56) References Cited

U.S. PATENT DOCUMENTS

2013/0139784 A1    6/2013  Pierz
2020/0165960 A1*  5/2020  Takada .................... F02B 19/12
2020/0165962 A1    5/2020  Takada

FOREIGN PATENT DOCUMENTS

WO        20200154748 A1    8/2020
WO   WO-2020154748 A1 *  8/2020

OTHER PUBLICATIONS

PCT International Search Report and Written Opinion; Application No. PCT/AT2021/060038; dated Oct. 15, 2021; 12 pages.

* cited by examiner

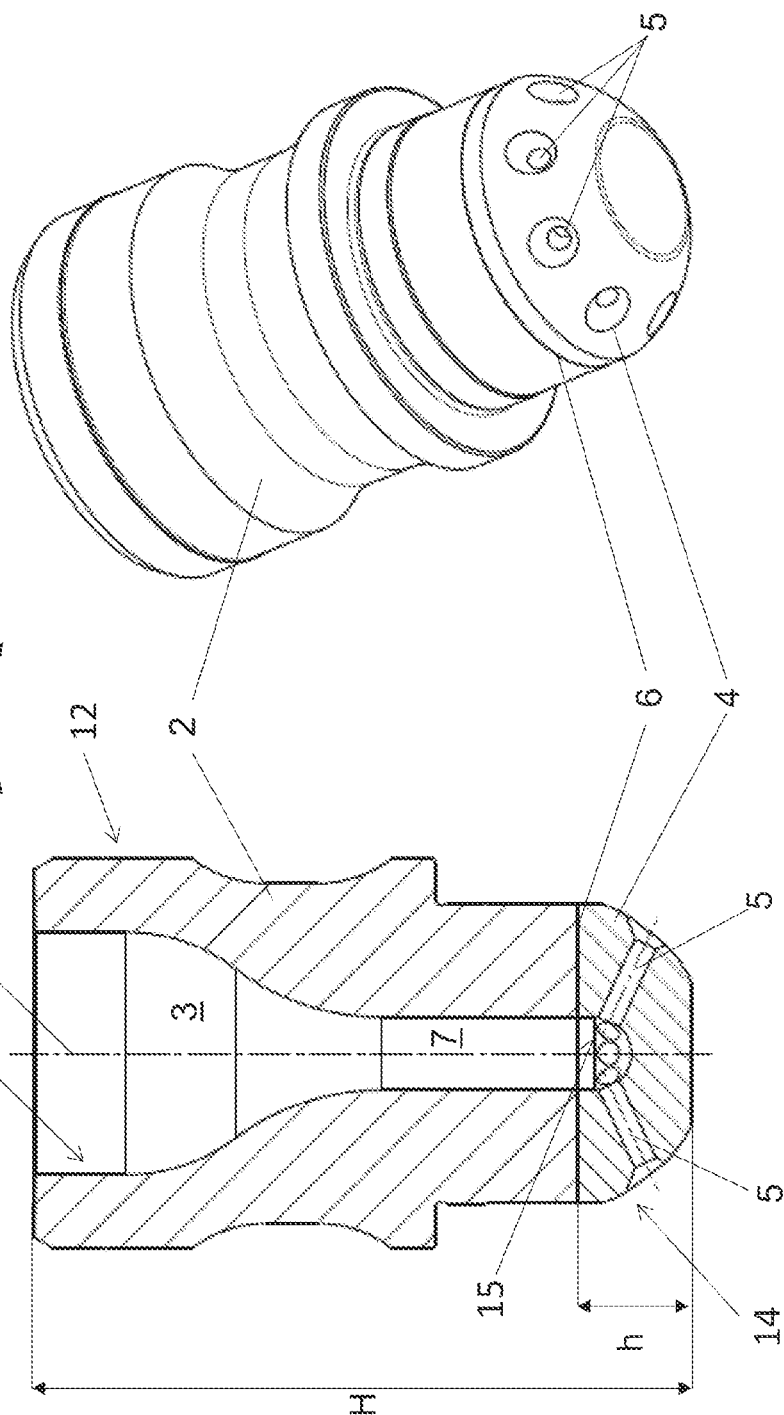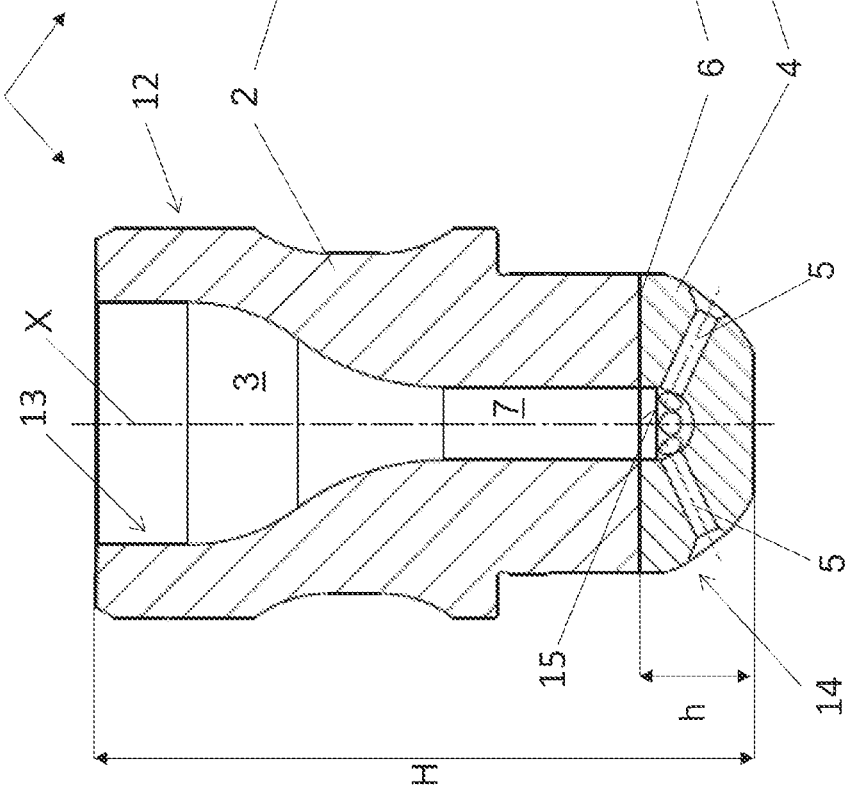

PRE-CHAMBER AND METHOD FOR PRODUCING A PRE-CHAMBER

CROSS-REFERENCE TO RELATED APPLICATION

This application is a National Stage entry from, and claims benefit of, PCT Application No. PCT/AT2021/060038, filed on Feb. 2, 2021, entitled "PRE-CHAMBER AND METHOD FOR PRODUCING A PRE-CHAMBER", which is herein incorporated by reference in its entirety.

BACKGROUND

The invention concerns a pre-chamber for an internal combustion engine, preferably a gas engine, and a method of producing such a pre-chamber.

Pre-chambers, according to certain aspects of the claims, include:
- a pre-chamber body;
- a pre-chamber volume which is surrounded by the pre-chamber body; and
- a pre-chamber tip portion comprising at least two, preferably more than two spray nozzles, wherein the at least two spray nozzles are in fluid communication with the pre-chamber volume, and the pre-chamber tip portion is affixed to the pre-chamber body by a welding process or a brazing process.

In internal combustion engines, especially comprising cubic capacity of more than five liters per main combustion chamber, pre-chambers are widely used serving as ignition amplifiers in order to effectively ignite the air-fuel mixture in the main combustion chamber. For this purpose, an ignition device such as a spark plug ignites the ignitable mixture in the pre-chamber volume, which is surrounded by the pre-chamber body. Since the pre-chamber volume is in fluid communication with the main combustion chamber via a plurality of spray nozzles, flame torches or flame jets protrude through the spray nozzles into the main combustion chamber and consequently ignite the ignitable mixture therein.

In general, pre-chambers are arranged in a cylinder head (or in a spark plug sleeve being itself arranged in a cylinder head), wherein the spark plug body being outside the main combustion chamber and only the pre-chamber tip protrudes into the main combustion chamber. This leads to a high thermal load in the area of the pre-chamber tip and therefore to high temperatures of the pre-chamber itself.

Associated with this is high wear of the pre-chamber tip, especially at the intersection region of the spray nozzles.

From US 2013/0139784 A1, it is known that the use of thermally high conductive materials for pre-chambers can be used to get rid of high temperatures in the pre-chamber body and especially in the area of the pre-chamber tip. The pre-chamber disclosed therein comprises a shell having a first thermal conductivity, the shell including an interior portion including an interior wall and an exterior portion including an exterior wall and a core having a second thermal conductivity. The core can be copper alloy or aluminum. The disadvantage of such a pre-chamber is the highly complex manufacturing process, i.e., producing the shell with a plurality of cavities and introducing the melted core material and the associated production costs.

WO 2020/154748 A1 discloses a pre-chamber which is manufactured with two parts. However, one of the two parts is made using an additive manufacturing process, also resulting in more effort and costs.

BRIEF DESCRIPTION

An aspect of the invention is therefore to provide a pre-chamber and pre-chamber manufacturing process alternative to the one known from the prior art. Another aspect of the invention is to provide a simpler (and therefore more cost-efficient) pre-chamber and pre-chamber manufacturing process compared to the prior art, preferably while providing reduced wear of the pre-chamber.

Regarding the pre-chamber, these aspects are achieved with the features set forth in the claims, namely in that the pre-chamber body consists of a material with higher thermal conductivity than the pre-chamber tip portion.

Regarding the method, the aspects are achieved with the features set forth in the claims, comprising the following steps:
- providing a first part, preferably from a first bar stock, and a second part, preferably from a second bar stock, the first part consisting of a material with higher thermal conductivity than the second part;
- joining the first part with the second part by a welding process or brazing process;
- machining of the first part comprising the machining, preferably turning, of a first outer contour resulting in an outer shape of the pre-chamber body; machining of the first part comprising the machining, preferably turning and/or milling, of a first inner contour resulting in a shape of the pre-chamber volume and/or at least part of a riser passage;
- machining of the second part comprising the machining, preferably turning, of a second outer contour resulting in an outer shape of the pre-chamber tip portion;
- machining of the second part comprising a machining, preferably drilling and/or milling, of a second inner contour resulting in a shape of the at least two spray nozzles and/or a shape of at least part of a riser passage.

Next to the clear effect of a simplified manufacturing process, aspects of the invention also result in lower temperatures of the pre-chamber tip portion during operation of the internal combustion engine, because the pre-chamber body conducts heat away from the pre-chamber tip portion much faster than in a monolithic pre-chamber.

Surprisingly, the inventors have discovered that aspects of the invention also can lead to lower mechanical stress in critical parts of the pre-chamber tip portion, because the lower temperatures create less mechanical stress from thermal expansion, and because the zones of maximal mechanical stresses are shifted to less critical areas (see also description of the figures).

Machining of the first inner contour and the first outer contour can be performed simultaneously.

Machining of the second inner contour and the second outer contour can be performed simultaneously.

Machining the first outer contour and/or the first inner contour and/or the second outer contour and/or the second inner contour can be performed after joining the machined front face of the first part with the machined front face of the second part.

However, machining the first outer contour and/or the first inner contour and/or the second outer contour and/or the second inner contour can also be performed before joining the machined front face of the first part with the machined front face of the second part.

The first part and the second part can in principle be joined at the first front face and the second front face concentrically and/or coaxially.

As is evident, the manufacturing method according to aspects of the invention is particularly flexible.

For the steps of the manufacturing method according to aspects of the invention, where turning is used for machining the first outer contour, the first inner contour, and the first outer contour (and potentially in part also the second inner contour), the first outer contour, the first inner contour, the second outer contour, and the second inner contour are then diameter contours or diameter profiles defining the corresponding shapes.

Protection is also sought for an arrangement of a cylinder head with a pre-chamber according to aspects of the invention and an internal combustion engine comprising a pre-chamber according to aspects of the invention or the mentioned arrangement. Further advantageous embodiments of the invention are defined in the dependent claims.

The pre-chamber volume can have a circular cross-section, preferably with a reducing radius towards the direction of the main combustion chamber, although other shapes of the pre-chamber volume are of course conceivable.

The pre-chamber can comprise a riser passage, which establishes fluid communication between the pre-chamber volume and the spray nozzles.

The riser passage can also be of cylindrical base shape.

The riser passage can be oriented such that its central axis is parallel, preferably coincides, with a longitudinal axis of the pre-chamber. In other preferred embodiments, the central axis of the riser passage is slanted with respect to the longitudinal axis of the pre-chamber and/or offset with respect to the longitudinal axis of the pre-chamber.

The spray nozzles are usually embodied as slanted bores between the riser passage and/or the pre-chamber volume on the one hand and the outer contour of the pre-chamber tip portion on the other hand, such that the flame jets extend at angles into the main combustion chamber covering as much of the main combustion chamber volume as possible. Other ways of manufacturing and/or embodying the spray nozzles are, of course, in principle conceivable.

The pre-chamber volume and/or the riser passage and/or the inner contour of the pre-chamber tip portion can be axis symmetric with respect to the longitudinal axis of the longitudinal axis, in particular symmetric with respect to rotations around the longitudinal axis by 360°/n, where n is the number of spray nozzles.

The pre-chamber body can consist of copper or a copper alloy and/or the pre-chamber tip portion can consist of a material with higher wear resistance than the pre-chamber body, preferably alloyed steel.

In particular, the pre-chamber body can consist of a copper-nickel alloy, such as preferably $CuNi_3Si$ and/or $CuNi_2Si$, and/or the pre-chamber tip portion can consist of alloy 416, or alloy 4140, or alloy HA 282. Tests conducted by the inventors have shown that these materials result in some of the lowest known temperatures of the pre-chamber tip portion during operation.

A tip height of the pre-chamber tip portion can be less than 50%, preferably less than 30%, particularly preferably less than 20%, of an overall height of the pre-chamber, wherein both the tip height and the overall height are measured along a longitudinal axis of the pre-chamber.

Preferably, the tip height is at least big enough so that the at least two spray nozzles and an intersection of the spray nozzles are contained in the pre-chamber tip portion.

The value for the tip height can be chosen based on two opposing effects:
1) The closer the joint between the pre-chamber body and the pre-chamber tip portion is to the end of the pre-chamber facing the combustion chamber, the lower the temperature at that end of the pre-chamber tip portion will be.
2) The closer the joint between the pre-chamber body and the pre-chamber tip portion is to the end of the pre-chamber facing the combustion chamber, the higher the temperature at the joint, and therefore the mechanical stress at the joint, will be.

A connecting interface between the pre-chamber body and the pre-chamber tip portion can be disposed inside a fire plate of the cylinder head, in order to protect the interface between the pre-chamber tip portion and the pre-chamber body from the combustion inside the main combustion chamber. The fire plate is the part of the cylinder head, which is exposed to the main combustion chamber. It usually also has openings for valves and the ignition assembly.

One aspect of the invention is that the height of the pre-chamber tip portion is chosen such that the interface is inside the fire plate, when the pre-chamber is mounted inside the cylinder head.

As mentioned before, the pre-chamber volume and the at least two spray nozzles can be in fluid connection via a riser passage, wherein preferably at least a part of the riser passage is disposed in the pre-chamber tip portion.

The arrangement according to aspects of the invention can also include a liner/sleeve between the pre-chamber and the cylinder head. The arrangement comprising the pre-chamber, the liner, and an ignition device (such as a spark plug) can be referred to as ignition assembly.

A friction welding process or an electron-beam welding process can be used when joining the machined front face of first part with the machined front face of the second part.

Before the first part and the second part are joined, a front face of the first part and of a front face of the second part can be machined, and the machined front face of the first part can be joined with the machined front face of the second part by the welding process or the brazing process. In other words, the joining of the first part with the second part can be performed on front faces machined beforehand.

All features described with respect to the prior art can also be incorporated into the invention.

Internal combustion engines according to aspects of the invention can preferably
- be gas engines operated with natural gas or other combustible gases as component and/or
- be stationary or naval engines and/or
- be mechanically coupled to a generator for generating electrical energy (combinations of gas engines coupled to a generator are called gensets)

BRIEF DESCRIPTION OF THE DRAWINGS

Further details and advantages of the invention are apparent from the figures and the accompanying description of the figures. The figures show:

FIG. 1 is a cross-section of an embodiment of a pre-chamber according to aspects of the invention, FIG. 2 is a perspective view of the embodiment of FIG. 1, FIGS. 3 and 4 illustrate a comparison of the temperatures inside a pre-chamber according to the prior art and a pre-chamber according to aspects of the invention.

DETAILED DESCRIPTION

Figure 4:
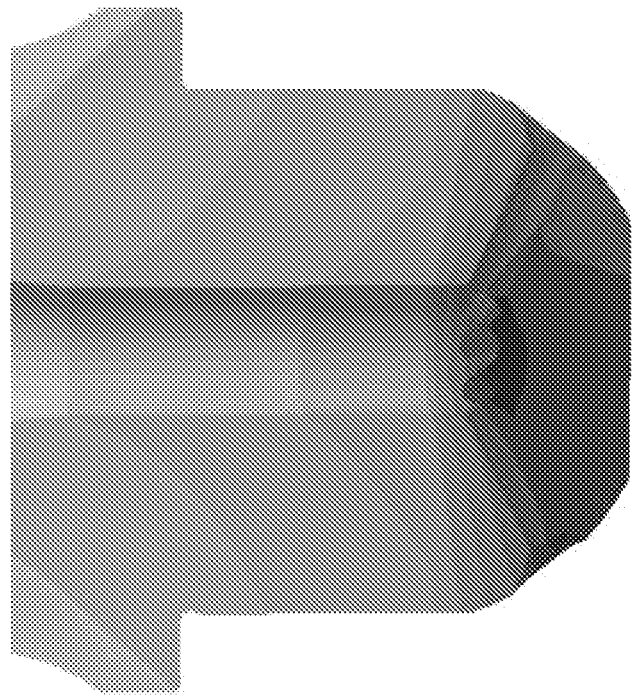

FIGS. 1 and 2 show an embodiment of the pre-chamber 1 according to aspects of the invention. The pre-chamber 1 comprises a pre-chamber body 2, which encloses the pre-chamber volume 3.

The pre-chamber tip portion 4 is affixed to the pre-chamber body 2, in this case through a welding process attaching the pre-chamber tip portion 4 to the pre-chamber body 2 at the interface 6.

The tip portion 4 includes in this example eight spray nozzles 5.

In this embodiment, the pre-chamber volume 3 is in fluid communication with the spray nozzles 5 through a riser passage 7.

If an air fuel mixture is ignited in the pre-chamber volume 3, the resulting combusting mixture will travel from the pre-chamber volume 3 down the riser passage 7 and through the spray nozzles 5. The combusting mixture will then form flame jets extending into the main combustion chamber, where a potentially very lean (high lambda) air fuel mixture can be ignited thoroughly and swiftly.

Figure 3:
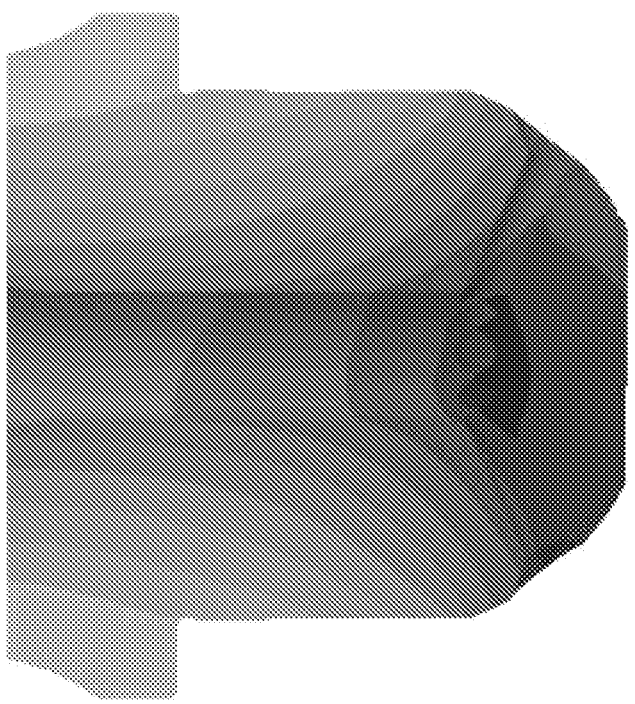

FIGS. 3 and 4 show a comparison of the temperatures inside a pre-chamber 1 according to the prior art and a pre-chamber according to aspects of the invention (FIG. 3: prior art, FIG. 4: according to aspects of the invention). The embodiment according to the prior art is a monolithic pre-chamber 1.

Evidently, the pre-chamber 1 according to the prior art overall exhibits much higher temperatures, especially at the tip portion. Here, the advantage of aspects of the invention can be seen plainly. The pre-chamber tip portion 4 according to aspects of the invention experiences much lower temperatures, even though it can still be made from a material with very high thermal resistance. At the same time, the effort for manufacturing the pre-chamber 1 according to aspects of the invention is only increased marginally compared to the pre-chamber 1 of FIG. 1, and the effort for manufacturing according to aspects of the invention is massively smaller compared to pre-chambers 1 as disclosed in US 2013/0139784 A1.

Figure 6:
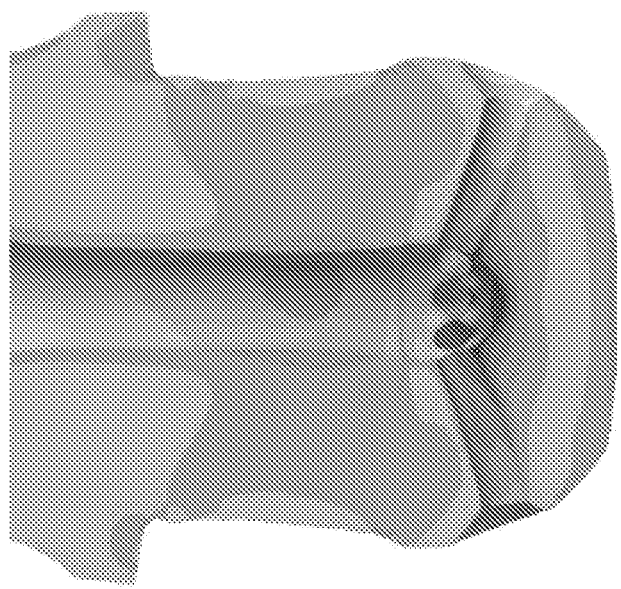
FIGS. 5 and 6 illustrate a comparison of the mechanical stresses inside a pre-chamber according to the prior art and a pre-chamber according to aspects of the invention.
Figure 5:
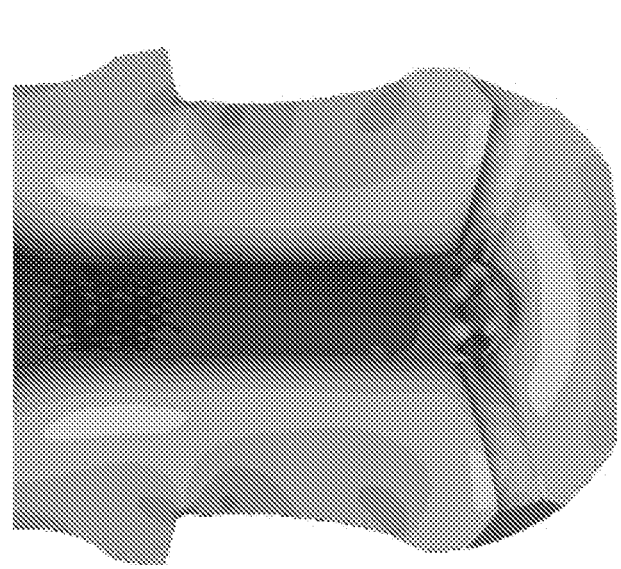

Surprisingly, aspects of the invention can also decrease and shift the location of the maximum of mechanical stress present in the pre-chamber 1 during operation, even though there is a welded or brazed joint present. FIGS. 5 and 6 are a comparison between the mechanical stresses in a monolithic pre-chamber 1 according to the prior art (FIG. 5) and according to aspects of the invention (FIG. 6).

Even though there is a slight increase in mechanical stress near the welded joint, the stress near the bridges between the openings for the spray nozzles 5 experience a lower mechanical stress. It should be pointed out that the areas between the openings for the spray nozzles 5 experience the highest mechanical and thermal loads in the pre-chamber 1, so that a reduction of stress in this area is far more important than the slight increase of the stress near the joint.

The reduction of mechanical stress according to aspects of the invention originates from at least the following two reasons:
 reduced temperature level in the pre-chamber tip portion;
 initiated residual stresses in the joint (due to different thermal expansion of the welded or brazed material), which reduce maximum stresses and shift the locations of maximum stresses in critical areas.

FIGS. 3 to 6 are grey scale depictions where darker shades of grey signify higher temperatures/stresses, and lighter shades of grey signify lower temperatures/stresses.

Figure 8:
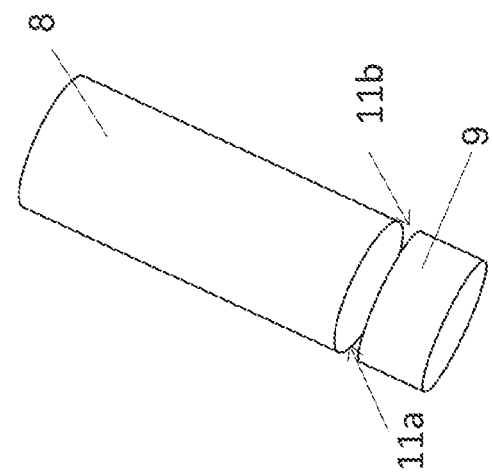
FIGS. 7 and 8 illustrate two steps during an embodiment of the production method according to aspects of the invention.
Figure 7:
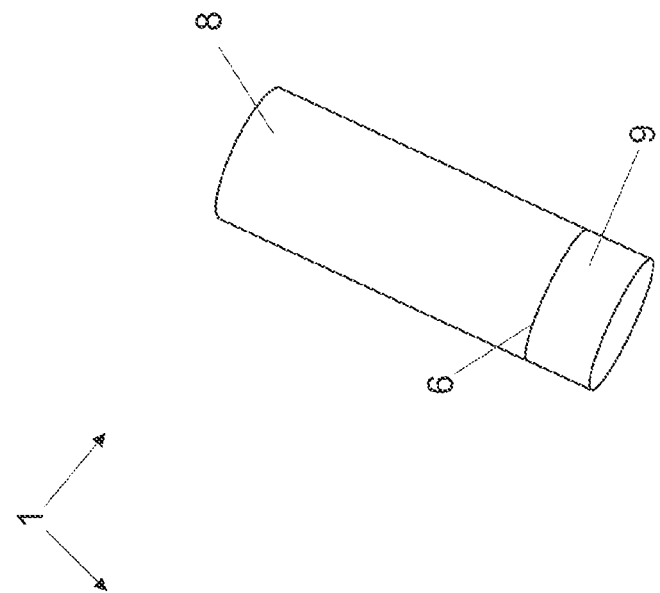

FIGS. 7 and 8 show intermediary steps in an embodiment of the production/manufacturing method according to aspects of the invention.

In this embodiment, initially a first part 8 and a second part 9, both in the form of bar stock, are provided (FIG. 7). The first part 8 and the second part 9 may both include machined front faces 11$a$ and 11$b$, respectively.

The first part 8 and the second part 9 are then joined by a welding process at the interface 6 (FIG. 8).

Subsequently, the first part 8 and the second part 9 can be machined to yield the first outer contour 12, the first inner contour 13, the second outer contour 14, and the second inner contour 15 as depicted in FIG. 1.

The at least two spray nozzles 5 can additionally or alternatively be manufactured as bores, and inner edges can be rounded afterwards.

Alternatively, the embodiment of FIG. 1 can be manufactured by first machining the first part 8 and the second part 9 creating the first outer contour 12, the first inner contour 13, the second outer contour 14, and the second inner contour 15, and then the first part 8/pre-chamber body 2 and the second part 9/pre-chamber tip portion 4 can be joined.

Mixed embodiments where some of the contours (e.g., the first outer contour 12, the first inner contour 13, the second outer contour 14, and the second inner contour 15) are machined before the joining of the first part 8 and the second part 9 and other contours can be machined afterwards.

Figure 9:
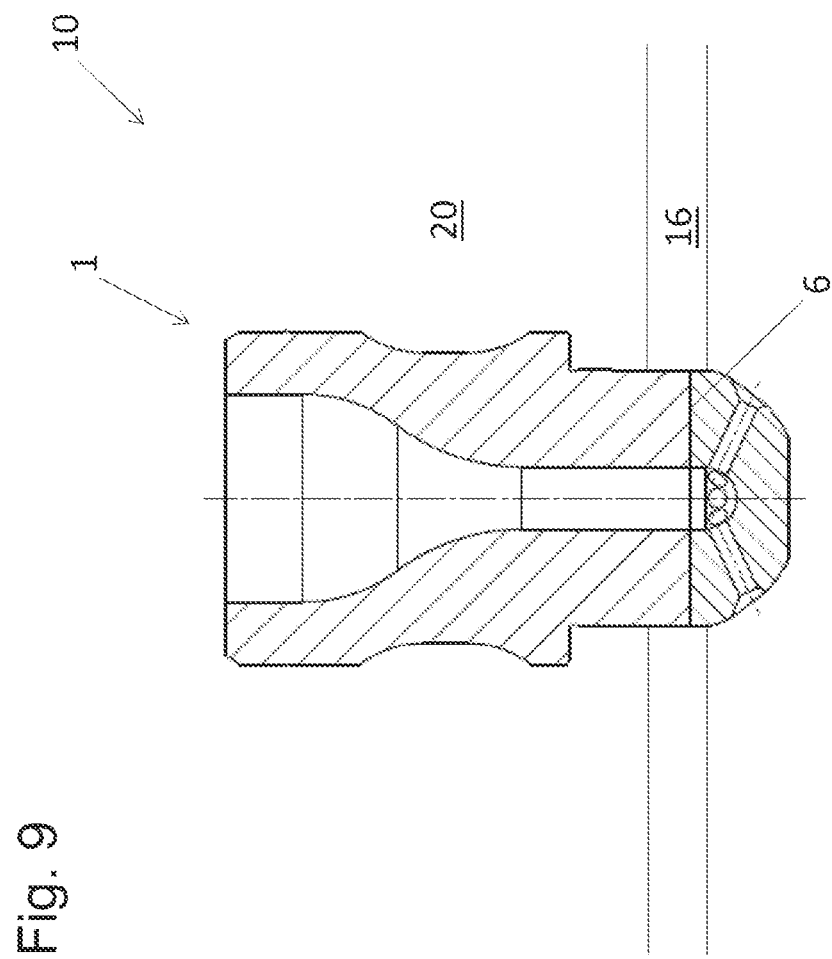
FIG. 9 is an embodiment of the internal combustion engine according to aspects of the invention.

FIG. 9 shows an embodiment of an internal combustion engine 10 in the vicinity of the cylinder head 20.

The pre-chamber 1 is arranged inside the cylinder head 20. In the arrangement of the cylinder head 20 and the pre-chamber 1, the relative position is such that the interface 6 between the pre-chamber body 2 and the pre-chamber tip portion 4 is disposed inside the fire plate 16.

The invention claimed is:

1. A system, comprising:
 a pre-chamber for an internal combustion engine, comprising:
  a pre-chamber body;
  a pre-chamber volume surrounded by the pre-chamber body; and
  a pre-chamber tip portion comprising at least two spray nozzles, wherein the at least two spray nozzles are in fluid communication with the pre-chamber volume, and the pre-chamber tip portion is affixed to the pre-chamber body by a welded joint or a brazed joint;
  wherein the pre-chamber body consists of a first material with a higher thermal conductivity than a second material of the pre-chamber tip portion, wherein the first material of the pre-chamber body consists of copper or a copper alloy and/or the second material of the pre-chamber tip portion consists of an alloyed steel having a higher wear resistance than the first material of the pre-chamber body.

2. The system according to claim 1, wherein the first material of the pre-chamber body consists of a copper-nickel alloy and/or the second material of the pre-chamber tip portion consists of alloy 416, or alloy 4140, or alloy HA 282.

3. The system according to claim 1, wherein a tip height (h) of the pre-chamber tip portion is less than 20% of an overall height (H) of the pre-chamber, wherein both the tip height (h) and the overall height (H) are measured along a longitudinal axis (X) of the pre-chamber.

4. The system according to claim 1, wherein the pre-chamber volume and the at least two spray nozzles are in fluid connection via a riser passage, wherein at least a part of the riser passage is disposed in the pre-chamber tip portion.

5. The system according to claim 1, comprising the welded joint having a friction welded joint or an electron-beam welded joint.

6. The system according to claim 1, comprising a cylinder head of the internal combustion engine, wherein the pre-chamber is coupled to the cylinder head, wherein a connecting interface between the pre-chamber body and the pre-chamber tip portion is disposed inside a fire plate of the cylinder head when the pre-chamber is mounted inside the cylinder head.

7. The system according to claim 1, comprising the internal combustion engine having the pre-chamber.

8. The system according to claim 1, wherein the first material of the pre-chamber body consists of the copper or the copper alloy and the second material of the pre-chamber tip portion consists of the alloyed steel having the higher wear resistance than the first material of the pre-chamber body.

9. A method for producing a pre-chamber, comprising:
providing a first part and a second part, the first part consisting of a first material with a higher thermal conductivity than a second material of the second part;
joining the first part with the second part by a welding process or a brazing process;
machining of the first part to form a first outer contour of a pre-chamber body of the pre-chamber;
machining of the first part to form a first inner contour of a pre-chamber volume and/or at least part of a riser passage of the pre-chamber;
machining of the second part to form a second outer contour of a pre-chamber tip portion of the pre-chamber; and
machining of the second part to form a second inner contour of at least two spray nozzles and/or at least part of the riser passage.

10. The method according to claim 9, wherein machining the first outer contour and/or the first inner contour and/or the second outer contour and/or the second inner contour is performed after joining a first machined front face of the first part with a second machined front face of the second part.

11. The method according to claim 9, wherein machining the first outer contour and/or the first inner contour and/or the second outer contour and/or the second inner contour is performed before joining a first machined front face of the first part with a second machined front face of the second part.

12. The method according to claim 9, wherein joining the first part with the second part comprises a friction welding process or an electron-beam welding process as the welding process for joining a first machined front face of the first part with a second machined front face of the second part.

13. The method according to claim 9, comprising rounding of inner edges, including a transition between the riser passage and the at least two spray nozzles.

14. The method according to claim 9, wherein the following steps are performed:
before the first part and the second part are joined, machining of a first front face of the first part to obtain a first machined front face and of a second front face of the second part to obtain a second machined front face, and
joining the first machined front face of the first part with the second machined front face of the second part by the welding process or the brazing process.

15. A system, comprising:
a pre-chamber for an internal combustion engine, comprising:
a pre-chamber body consisting essentially of a first material;
a pre-chamber volume surrounded by the pre-chamber body; and
a pre-chamber tip portion consisting essentially of a second material, wherein the pre-chamber tip portion comprises one or more fluid nozzles in fluid communication with the pre-chamber volume, and the pre-chamber tip portion is coupled to the pre-chamber body;
wherein the first material of the pre-chamber body has a higher thermal conductivity than the second material of the pre-chamber tip portion, and the second material of the pre-chamber tip portion has a higher wear resistance than the first material of the pre-chamber body.

16. The system according to claim 15, comprising a cylinder head and/or the internal combustion engine having the pre-chamber.

17. The system according to claim 15, wherein the second material of the pre-chamber tip portion consists essentially of an alloyed steel.

18. The system according to claim 15, wherein the first material of the pre-chamber body consists essentially of copper or a copper alloy.

19. The system according to claim 15, wherein the first material of the pre-chamber body consists essentially of a copper-nickel alloy and the second material of the pre-chamber tip portion consists essentially of an alloy 416, or alloy 4140, or alloy HA 282.

20. The system according to claim 19, wherein the copper-nickel alloy consists essentially of $CuNi_3Si$ and/or $CuNi_2Si$.

21. A system, comprising:
a pre-chamber for an internal combustion engine, comprising:
a pre-chamber body;
a pre-chamber volume surrounded by the pre-chamber body; and
a pre-chamber tip portion comprising at least two spray nozzles, wherein the at least two spray nozzles are in fluid communication with the pre-chamber volume, and the pre-chamber tip portion is affixed to the pre-chamber body by a welded joint or a brazed joint;
wherein the pre-chamber body consists of a first material with a higher thermal conductivity than a second material of the pre-chamber tip portion; and
wherein the pre-chamber volume and the at least two spray nozzles are in fluid connection via a riser passage, wherein at least a part of the riser passage is disposed in the pre-chamber tip portion.

22. The system according to claim 21, wherein the second material of the pre-chamber tip portion has a higher wear resistance than the first material of the pre-chamber body.

23. The system according to claim 22, wherein a tip height (h) of the pre-chamber tip portion is less than 20% of an overall height (H) of the pre-chamber, wherein both the tip height (h) and the overall height (H) are measured along a longitudinal axis (X) of the pre-chamber.

24. A system, comprising:
a pre-chamber for an internal combustion engine, comprising:
  a pre-chamber body consisting essentially of a first material;
  a pre-chamber volume surrounded by the pre-chamber body; and
  a pre-chamber tip portion consisting essentially of a second material, wherein the pre-chamber tip portion comprises one or more fluid nozzles in fluid communication with the pre-chamber volume, and the pre-chamber tip portion is coupled to the pre-chamber body;
  wherein the first material of the pre-chamber body has a higher thermal conductivity than the second material of the pre-chamber tip portion, and the second material of the pre-chamber tip portion consists essentially of steel.

25. The system according to claim 24, wherein the first material of the pre-chamber body consists essentially of copper, a copper alloy, or a copper-nickel alloy.

* * * * *